(12) United States Patent
Minamino

(10) Patent No.: US 7,466,454 B2
(45) Date of Patent: Dec. 16, 2008

(54) IMAGE PROCESSING DEVICE AND IMAGE PROCESSING METHOD

(75) Inventor: Katsushi Minamino, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 692 days.

(21) Appl. No.: 11/173,782

(22) Filed: Jun. 30, 2005

(65) Prior Publication Data

US 2006/0017978 A1    Jan. 26, 2006

(30) Foreign Application Priority Data

Jul. 26, 2004  (JP) ............... 2004-216844
May 10, 2005  (JP) ............... 2005-136867

(51) Int. Cl.
*G06K 15/00* (2006.01)
*G06K 9/36* (2006.01)

(52) U.S. Cl. ................. 358/3.03; 382/252

(58) Field of Classification Search ........... 358/3.03, 358/3.05, 3.06; 382/252

See application file for complete search history.

(56) References Cited

U.S. PATENT DOCUMENTS

| | | | |
|---|---|---|---|
| 6,201,612 B1* | 3/2001 | Matsushiro et al. | 358/1.9 |
| 6,697,433 B1* | 2/2004 | Isu et al. | 375/240.27 |
| 6,885,472 B1* | 4/2005 | Konno et al. | 358/1.15 |
| 7,130,474 B2* | 10/2006 | Luo et al. | 382/239 |
| 7,372,594 B1* | 5/2008 | Kusakabe et al. | 358/1.9 |

FOREIGN PATENT DOCUMENTS

| JP | 11-225273 | 8/1999 |
|---|---|---|
| JP | 2003-116001 | 4/2003 |

OTHER PUBLICATIONS

Kotowski, "Achromatic Light—gray levels", retrieved from internet archive dated May 30, 2003 and May 1, 2003 (for author information), 10 pages.*

* cited by examiner

*Primary Examiner*—Vikkram Bali
*Assistant Examiner*—Soo Jin Park
(74) *Attorney, Agent, or Firm*—Hogan & Hartson LLP

(57) ABSTRACT

An image processing device includes a pre-processing unit, an adder, a quantization unit, a post-processing unit and a surrounding error calculating unit. The pre-processing unit calculates an average pixel value of an aggregated pixel formed of a plurality of adjacent pixels for input image data. The adder calculates a correction average pixel value by adding a correction error value to an average pixel value of a target aggregated pixel to be a processing object. The quantization unit carries out a quantization processing of the correction average pixel value at a quantization level of a prescribed number. The post-processing unit divides the aggregated pixel into a plurality of pixels and allocates a pixel value corresponding to the quantization level to each of the divided pixels. The surrounding error calculating unit calculates a correction error value for processing a surrounding target aggregated pixel in accordance with a quantization error generated in the quantization processing.

10 Claims, 12 Drawing Sheets

FIG. 4

| QUANTIZATION LEVEL | 0 | 1 | 2 | 3 | 4 | 5 |
|---|---|---|---|---|---|---|
| PIXEL VALUE (8 BITS) | 00000000 | 11110000 | 11111000 | 11111100 | 11111110 | 11111111 |

FIG. 6

| QUANTIZATION LEVEL | 0 | 1 | 2 | 3 | 4 |
|---|---|---|---|---|---|
| PIXEL VALUE (4 BITS) | 0000 | 1100 | 1101 | 1110 | 1111 |

FIG. 9

| QUANTIZATION LEVEL | 0 | 1-4 | 5 | 6 | 7 | 8 |
|---|---|---|---|---|---|---|
| PIXEL VALUE (8 BITS) | 00000000 | 11110000 | 11111000 | 11111100 | 11111110 | 11111111 |

IMAGE PROCESSING DEVICE AND IMAGE PROCESSING METHOD

BACKGROUND OF THE INVENTION

1. Field of the Invention

The present invention relates to an image processing device and an image processing method, an in particular, relates to an image processing device and an image processing method which process input image data by an error diffusion method.

2. Description of Related Art

To reproduce an image, an electrophotographic printer processes image data by an error diffusion method. In this case, when black isolated points and white isolated points generate, reproducibility of dots relating to the isolated points becomes unstable. As a result, there are many cases in which tone reproducibility deteriorates. In particular, there are many cases in which tone in a highlight part and a dark part deteriorates, and compared with a case in which an image processing is carried out by an ordered dither method, there are many cases in which density reproducibility of halftone deteriorates. Meanwhile, the image processing by the ordered dither method has a drawback that moire, which is difficult to generate in the image processing by the error diffusion method, is prone to generate in a reproduced image.

A conventional technology relating to an image processing by an improved error diffusion method reduces noise in a highlight part and a shadow part (a dark part). According to this technology, when calculating a correction value to be added to input image data before a quantization processing, a threshold value and an error amount in the quantization processing are fluctuated.

According to the conventional technology, to calculate a quantization error and to calculate a correction error to be added to the input image data, a complicated processing is required to be carried out. As a result, a large burden is imposed on hardware for the processing.

SUMMARY OF THE INVENTION

The present invention has been made in consideration of the above-described circumstances. An advantage of the present invention is to provide an image processing device and an image processing method which reduce a load relating to an image processing by an error diffusion method and improve reproducibility in halftone of a reproduced image.

According to an aspect of the present invention, an image processing device includes a pre-processing unit, an adder, a quantization unit, a post-processing unit and a surrounding error calculating unit. The pre-processing unit calculates an average pixel value of an aggregated pixel formed of a plurality of adjacent pixels for input image data. The adder calculates a correction average pixel value by adding a correction error value to an average pixel value of a target aggregated pixel to be a processing object. The quantization unit carries out a quantization processing of the correction average pixel value at a quantization level of a prescribed number. The post-processing unit divides the aggregated pixel into a plurality of pixels and allocates a pixel value corresponding to the quantization level to each of the divided pixels. The surrounding error calculating unit calculates a correction error value for processing the surrounding target aggregated pixel in accordance with a quantization error generated in the quantization processing.

According to the above-described image processing device, by executing a level number reduction processing, when a processing tone number per one pixel in an image output device is k, the quantization unit can execute the quantization processing at a quantization level of a number smaller than a number $[n\times(k-1)+1]$.

When levels from a minimum density level to a maximum density level are divided evenly into a plurality of levels by the level number reduction processing, levels from a next level of the minimum density level to a density level of a prescribed order can be output as a common quantization level.

When dividing the aggregated pixel into n pixels ($n\geq 2$) by the post-processing unit, a number m of the quantization level output from the quantization unit can be expressed by the following equation:

$$m=2+(k-1)\times(n-1)$$

In the above-described image processing device, by executing the level number reduction processing, when the processing tone number per, one pixel in the image output device is k, for quantization levels of $[n\times(k-1)+1]$ ways, the post-processing unit can allocate pixel values by a number of combinations smaller than $[n\times(k-1)+1]$ ways.

For the density levels from the next level of the minimum density level to the density level of the prescribed order, the level number reduction processing can output a common pixel value to the quantization levels output from the quantization unit.

When dividing the aggregated pixel into n pixels ($n\geq 2$) by the post-processing unit, the number m of the quantization level output from the quantization unit can be expressed by the following equation:

$$m=n\times(k-1)+1$$

The post-processing unit can output a common pixel value for the quantization levels from 1 to (k-1).

In the above-described image processing device, for the quantization error of the aggregated pixels located around the target aggregated pixel, the surrounding error calculating unit can calculate the correction error value by applying weight to a relative positional relationship between the surrounding aggregated pixels and the target aggregated pixel.

In the above-described image processing device, the post-processing unit retains a correspondence relationship between a quantization level and an output pixel value. By referring to the correspondence relationship, the post-processing unit can allocate a pixel value corresponding to the quantization level to each of the divided pixels.

In the above-described image processing device, the post-processing unit retains the correspondence relationship between the quantization level and the output pixel value for each output bit number. By referring to the correspondence relationship, the post-processing unit can allocate the pixel value corresponding to the quantization level to each of the divided pixels by an output bit number that complies with the image output device.

According to another aspect of the present invention, an image processing device includes a first image processing unit, a second image processing unit, a selecting unit and a feature detecting unit. The first image processing unit and the second image processing unit are both an image processing unit which processes input image data by an error diffusion method. A quantization method of the first image processing unit and a quantization method of the second image processing unit are different. The selecting unit selects either one of an output pixel value of the first image processing unit and an output value of the second image processing unit. The feature detecting unit detects whether an area where the input image data belongs is an area that emphasizes reproduction of a line image or an area that emphasizes reproduction of tone in accordance with the input image data. The first image processing unit includes a pre-processing unit, an adder, a quantization unit, a post-processing unit and a surrounding error calculating unit. The pre-processing unit calculates an average pixel value of an aggregated pixel formed of a plurality of adjacent pixels for the input image data. The adder calculates a correction average pixel value by adding a correction error value to an average pixel value of a target aggregated pixel to be a processing object. The quantization unit carries out a quantization processing of the correction average pixel value at a quantization level of a prescribed number. The post-processing unit divides the aggregated pixel into a plurality of pixels and allocates a pixel value corresponding to the quantization level to each of the divided pixels. The surrounding error calculating unit calculates a correction error value for processing the target aggregated pixel in accordance with a quantization error generated in the quantization processing. The selecting unit selects either one of the output pixel value of the first image processing unit and the output pixel value of the second image processing unit in accordance with a detection result of the feature detecting unit.

In the above-described image processing device, the second image processing unit includes an adder, a quantization unit, a post-processing unit and a surrounding error calculating unit. The adder calculates a correction pixel value by adding a correction error value to a pixel value of a target pixel to be a processing object for the input image data. The quantization unit carries out a quantization processing of the correction pixel value at a quantization level of a prescribed number. The post-processing unit outputs a pixel value corresponding to the quantization level. The surrounding error calculating unit calculates a correction error value for processing a pixel located around the target pixel in accordance with a quantization error generated in the quantization processing.

According to another aspect of the present invention, an image processing method processes input image data by an error diffusion method. The image processing method includes a pre-processing step, an adding step, a quantizing step, a post-processing step and a surrounding error calculating step. At the pre-processing step, an average pixel value of an aggregated pixel formed of a plurality of adjacent pixels is calculated for the input image data. At the adding step, a correction average pixel value is calculated by adding a correction error value to an average pixel value of a target aggregated pixel to be a processing object. At the quantizing step, a quantization processing of the correction average pixel value is carried out at a quantization level of a prescribed number. At the post-processing step, the aggregated pixel is divided into a plurality of pixels and a pixel value corresponding to the quantization level is allocated to each of the divided pixels. At the surrounding error calculating step, a correction error value for processing a surrounding target aggregated pixel is calculated in accordance with a quantization error generated in the quantization processing.

According to the above-described aspect, the pre-processing unit calculates the average pixel value for the pixel values of each of the pixels that form the aggregated pixel, and the adder calculates the correction average pixel value by adding the correction error value to the average pixel value. This processing is carried out by sequentially moving the target aggregated pixel to be the processing object. The quantization unit outputs the quantization level corresponding to the correction average pixel value as a quantization result. The post-processing unit divides the pixels of the target aggregated pixel, allocates a pixel value to each of the divided pixels and outputs the pixel values. The pixel values are allocated in accordance with the quantization level output from the quantization unit and a relationship between the quantization level and the pixel value associated with one another previously. The surrounding error calculating unit calculates the correction error value for processing a surrounding target aggregated pixel in accordance with the quantization error generated in the quantization processing of the quantization unit. Then, the surrounding error calculating unit outputs the calculated correction error value to the adder. Accordingly, the quantization processing can be carried out for each aggregated pixel. As a result, a load relating to the quantization processing can be reduced and reproducibility in halftone of the reproduced image can be improved.

The image processing device includes the first image processing unit having the above-described configuration, the second image processing unit having a conventional configuration and the selecting unit. Accordingly, a processing method can be changed according to whether the area where the input image data belongs is the area that emphasizes the reproduction of the tone or the area that emphasizes the reproduction of the line image. Thus, an image processing can be carried out according to a feature part of an image and the reproducibility in the halftone of the reproduced image can be improved.

According to the present invention, the load relating to the image processing by the error diffusion method can be reduced and the reproducibility in the halftone of the reproduced image can be improved.

BRIEF DESCRIPTION OF THE SEVERAL VIEWS OF THE DRAWINGS

FIG. 4 shows a relationship between a quantization level and an output pixel value.

FIG. 6 shows a relationship between a quantization level and an output pixel value.

FIG. 9 shows a relationship between a quantization level and an output pixel value.

DETAILED DESCRIPTION OF THE INVENTION

With reference to the drawings, a description will be made of an image processing device according to an embodiment of the present invention. The image processing device processes input image data by an error diffusion method. The error diffusion method includes an error diffusion method an average error minimization method.

First Embodiment

Figure 1:
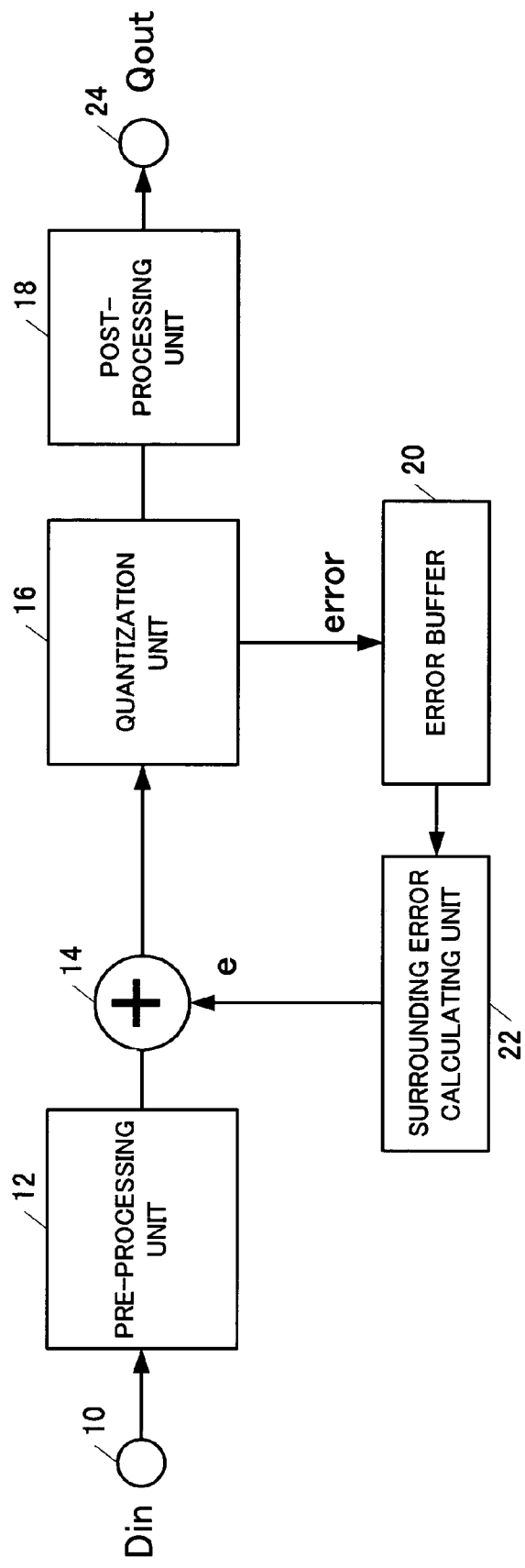
FIG. 1 is a block diagram showing an image processing device according to an embodiment of the present invention.

FIG. 1 is a block diagram showing an image processing device according to a first embodiment of the present invention. The image processing device includes a pre-processing unit 12, an adder 14, a quantization unit 16, a post-processing unit 18 and a surrounding error calculating unit 22. The pre-processing unit 12 calculates an average pixel value of an aggregated pixel formed of a plurality of adjacent pixels for input image data. The adder 14 calculates a correction average pixel value by adding a correction error value to an average pixel value of a target aggregated pixel to be a processing object. The quantization unit 16 carries out a quantization processing of the correction average pixel value at a quantization level of a prescribed number. The post-processing unit 18 divides the aggregated pixel into a plurality of pixels and allocates a pixel value corresponding to the quantization level to each of the divided pixels. The surrounding error calculating unit 22 calculates a correction error value for processing a surrounding target aggregated pixel in accordance with a quantization error generated in the quantization processing.

Such an image processing device carries out an image processing by a procedure of the following image processing method. The image processing method processes input image data by an error diffusion method. The image processing method includes a pre-processing step, an adding step, a quantizing step, a post-processing step and a surrounding error calculating step. At the pre-processing step, an average pixel value of an aggregated pixel formed of a plurality of adjacent pixels is calculated for the input image data. At the adding step, a correction average pixel value is calculated by adding a correction error value to an average pixel value of a target aggregated pixel to be a processing object. At the quantizing step, a quantization processing of the correction average pixel value is carried out at a quantization level of a prescribed number. At the post-processing step, the aggregated pixel is divided into a plurality of pixels and a pixel value corresponding to the quantization level is allocated to each of the divided pixels. At the surrounding error calculating step, a correction error value for processing a surrounding target aggregated pixel is calculated in accordance with a quantization error generated in the quantization processing.

By carrying out the image processing according to the above-described procedure, at the pre-processing step, the pre-processing unit 12 calculates the average pixel value for the pixel values of each of the pixels that form the aggregated pixel, and at the adding step, the adder 14 calculates the correction average pixel value by adding the correction error value to the average pixel value. This processing is carried out by sequentially moving the target aggregated pixel to be the processing object. At the quantizing step, the quantization unit 16 outputs the quantization level corresponding to the correction average pixel value as a quantization result. At the post-processing step, the post-processing unit 18 divides the pixels of the target aggregated pixel. In addition, in accordance with the quantization level obtained at the quantizing step and a relationship between the quantization level and the pixel value associated with one another previously, the post-processing unit 18 allocates a pixel value to each of the divided pixels and outputs the pixel values. At the surrounding error calculating step, in accordance with the quantization error generated in the quantization processing at the quantizing step, the correction error value for processing the target aggregated pixel is calculated and output to the adder 14. Accordingly, a quantization processing can be carried out for each aggregated pixel. As a result, a load relating to the quantization processing can be reduced and reproducibility in halftone of a reproduced image can be improved.

In the following, a detailed description will be made of the processing in each structure. In FIG. 1, input image data Din is input from an input terminal 10 and the input image data Din is transmitted to the pre-processing unit 12. In the pre-processing unit 12, an aggregated pixel formed of adjacent n pixels is obtained for the input image data Din. Here, $n \geq 2$, for example, n is 2 or 3. An average pixel value is calculated by averaging pixel density values, in other words, pixel values, of each of the pixels of each aggregated pixel. Further, the input image data Din is multi-value data such as multi-value data obtained by being scanned optically and multi-value data created by a computer such as computer graphics.

Figure 2:
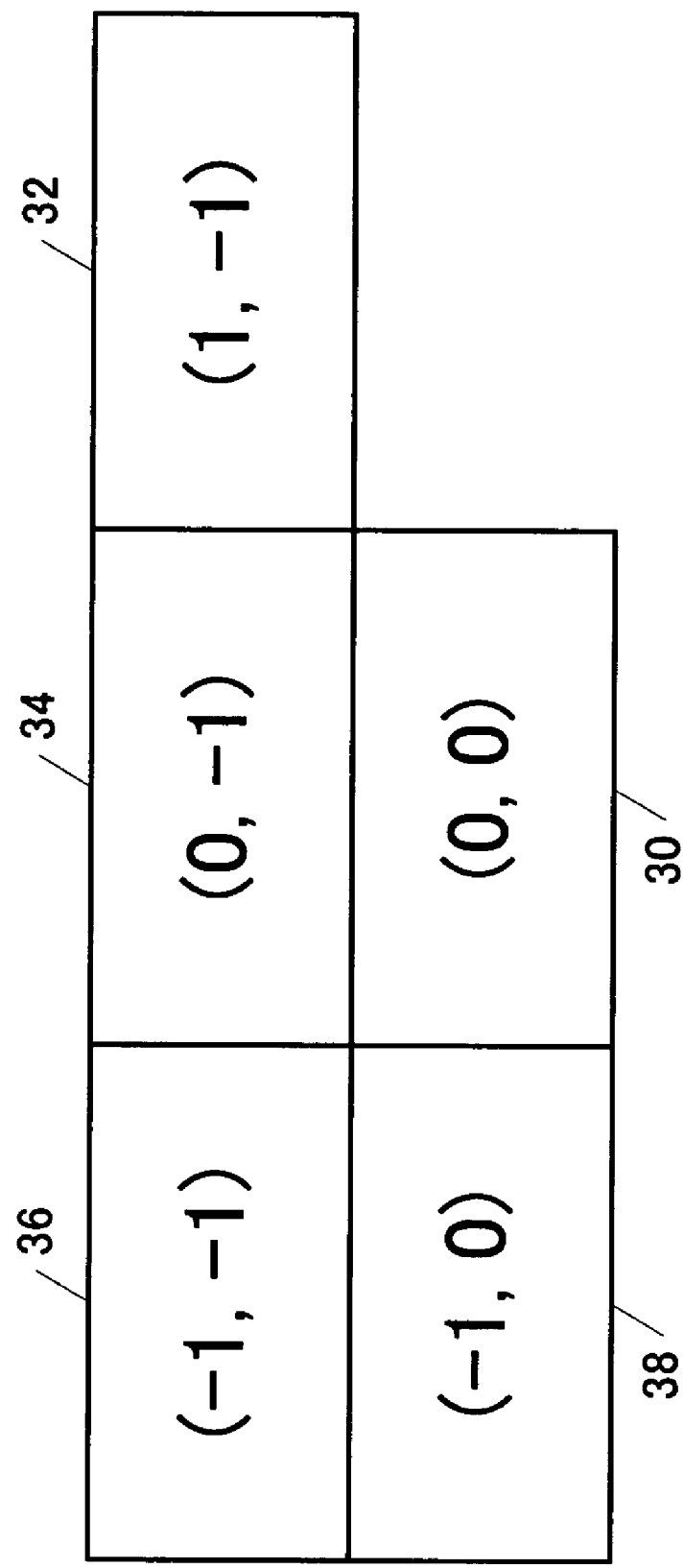
FIG. 2 shows a plurality of adjacent aggregated pixels.

FIG. 2 shows a plurality of adjacent aggregated pixels. In FIG. 2, two pixels form one aggregated pixel. The processing by the error diffusion method can use an error obtained in the quantization processing of an aggregated pixel adjacent to a target aggregated pixel to be a processing object, that is, an aggregated pixel located around the target aggregated pixel, in other words, located one before in a row direction or one before in a line direction with respect to a processing direction (a surrounding aggregated pixel). That is, when a position of a target aggregated pixel 30 is (0, 0), a surrounding aggregated pixel 36 is located at a relative position (−1, −1), a surrounding aggregated pixel 34 is located at a relative position (0, −1), a surrounding aggregated pixel 32 is located at a relative position (1, −1) and a surrounding aggregated pixel 38 is located at a relative position (−1, 0). As to be described later, in the quantization processing of the target aggregated pixel 30, errors obtained in the quantization processing of the surrounding aggregated pixels 32, 34, 36 and 38 can be used.

Referring to FIG. 1 again, the adder 14 calculates a correction average pixel value by adding a correction error value e to the average pixel value of the target aggregated pixel 30 to be the processing object. Further, the correction error value e is obtained by the surrounding error calculating unit 22 in a manner described herein.

The quantization unit 16 carries out the quantization processing of the correction average pixel value obtained by the adder 14 at the quantization level of the prescribed number. When the correction average pixel value corresponds with a pixel value between quantization levels, an error generates in the quantization processing of such an aggregated pixel. To diffuse this error to the quantization processing of a later (surrounding) aggregated pixel, the generated error component is transmitted to an error buffer 20.

The error buffer 20 temporarily retains the error component transmitted from the quantization unit 16. At a point of time when the quantization processing is carried out for all of the surrounding aggregated pixels of the target aggregated pixel by the quantization unit 16 and all error components to be used in an addition processing of the target aggregated pixel are obtained, the error components of the aggregated pixels corresponding to the surrounding aggregated pixels of the current target aggregated pixel are transmitted to the surrounding error calculating unit 22. For example, as shown in FIG. 2, in case of carrying out the processing of the target aggregated pixel 30, when errors of all of the surrounding aggregated pixels 32, 34, 36 and 38 are obtained, the errors of the surrounding aggregated pixels 32, 34, 36 and 38 are transmitted from the error buffer 20 to the surrounding error calculating unit 22.

The surrounding error calculating unit 22 calculates the correction error value for processing a surrounding target aggregated pixel in accordance with the quantization error generated in the quantization processing.

The surrounding target aggregated pixel refers to the surrounding aggregated pixel located around the quantized pixel when the input image data is obtained.

The error components from each of the surrounding aggregated pixels have different influence on the target aggregated pixel according to a relative positional relationship between each of the surrounding aggregated pixels and the target aggregated pixel. Therefore, when calculating the correction error value, weight corresponding to each relative position can be applied to each of the error components.

Specifically, when the position of the target aggregated pixel 30 is (0, 0), suppose that an error component that derives from the surrounding aggregated pixel 32 located at (1, −1) is e(−1, −1), an error component that derives from the surrounding aggregated pixel 34 located at (0, −1) is e(0, −1), an error component that derives from the surrounding aggregated pixel 36 located at (−1, −1) is e(−1, −1) and an error component that derives from the surrounding aggregated pixel 38 located at (−1, 0) is e(−1, 0). Then, the correction error value e can be calculated from the following equation.

$$e = a \times e(-1, -1) + b \times e(0, -1) + c \times e(1, -1) + d \times e(-1, 0)$$

As described above, by applying weight to each of the error components and calculating the correction error value, in the correction processing of the target aggregated pixel, an evaluation can be made properly on the error components of the surrounding aggregated pixels, which indicate different contributions for each relative position with respect to the target aggregated pixel. Accordingly, the deterioration of the tone in the highlight part and the dark part, which are a conventional drawback, can be suppressed.

The post-processing unit 18 divides the aggregated pixel into n pixels and allocates a pixel value corresponding to the quantization level to each of the divided pixels. In addition, a smoothing processing can be carried out.

The pixel values can be allocated by retaining the correspondence relationship between the quantization level and the output pixel value and referring to the correspondence relationship. By referring to such a retained correspondence relationship, the pixel values can be allocated easily and promptly.

The correspondence relationship between the quantization level and the output pixel value can be retained for each output bit number. In this case, by referring to this correspondence relationship, the pixel value corresponding to the quantization level can be allocated to each of the divided pixels at the output bit number that complies with the image output device such as a printer. As described above, even when the image processing device is applied to image output devices having different processing bit numbers, the image processing device can adopt easily to each of the image output devices.

The image data formed of the output pixel value obtained from the post-processing unit 18 is output from an output terminal 24. The image data output from the output terminal 24 can be used as, for example, dot information transmitted to a printing head of a printer.

In the above description, a number of the pixels that constitute one aggregated pixel in the pre-processing and a number of the pixels divided from one aggregated pixel in the post-processing are both the same number n. However, for example, when enlarging or reducing an input image and outputting the enlarged image or the reduced image, the number of the aggregated pixels of the pre-processing unit 12 and the number of the divided pixels of the post-processing unit 18 can be different values. For example, two pixels can be aggregated in the pre-processing and this aggregated pixel can be divided into three pixels in the post-processing.

Next, a detailed description will be made of the processing of the quantization unit 16 and the post-processing unit 18. In the above-described image processing device, by executing the level number reduction processing, when the processing tone number per one pixel in the image output device is k, the quantization unit 16 executes the quantization processing at the quantization level of a number smaller than a number [n×(k−1)+1].

When one aggregated pixel is regarded as one pixel, a maximum tone number, which can be expressed by such an aggregated pixel, becomes [n×(k−1)+1]. Therefore, [n×(k−1)+1] is regarded as the maximum tone number. "k−1" corresponds to the tone number excluding a minimum density level per one pixel. "+1" at a tail end corresponds to adding the minimum density level portion, in other words, a portion of a quantization level 0.

When levels from the minimum density level to a maximum density level are divided evenly into a plurality of levels, the level number reduction processing of the present embodiment can provide levels from a next level of the minimum density level to a density level of a prescribed order as a common quantization level.

When the levels from the minimum density level to the maximum density level are divided evenly, that is, at an equal interval, the levels can be divided into density levels of the maximum tone number. In this case, a density level "0" is the minimum density level and the density levels can be indicated by "1", "2", . . . and "[n×(k−1)+1]" in order. Suppose that the minimum density level, which can be reproduced stably in the image output device for reproducing the image, is a density level of a prescribed order. Then, in the level number reduction processing, for the density levels from a second density level "1" to the density level of the prescribed order, a common quantization level "1", which is not the quantization level 0 corresponding to the minimum density level "0", can be output as a result of the quantization processing. That is, for a density level which cannot be reproduced stably by the image output device, a common quantization level as the minimum density level among the density levels, which can be reproduced stably, is output as the result of the quantization processing. For example, in an electrophotographic printer, there are cases in which reproduction stability at a low density level is low. Accordingly, by applying the present embodiment, an image forming can be carried out at a density level having high reproduction stability.

As described above, by executing the level number reduction processing according to a feature of the image output device, the reproducibility in the halftone of the reproduced image can be improved.

Specifically, when dividing the aggregated pixel into n pixels (n≧2) by the post-processing unit 18, a number m of the quantization level output from the quantization unit 16 can be calculated by the following equation:

$$m = 2 + (k-1) \times (n-1)$$

The number m corresponds to a value obtained by subtracting "k−2" from the maximum tone number "[n×(k−1)+1]=n×k−(n−1)". When the "prescribed order" in the level number reduction processing is "k−1", "k−2" corresponds to a halftone number of a first pixel of an aggregated pixel, that is, a number of density levels excluding the minimum density level and the maximum density level. Accordingly, for one aggregated pixel, m=2+(k−1)×(n−1) ways of combinations of the pixel values are output.

Figure 3:
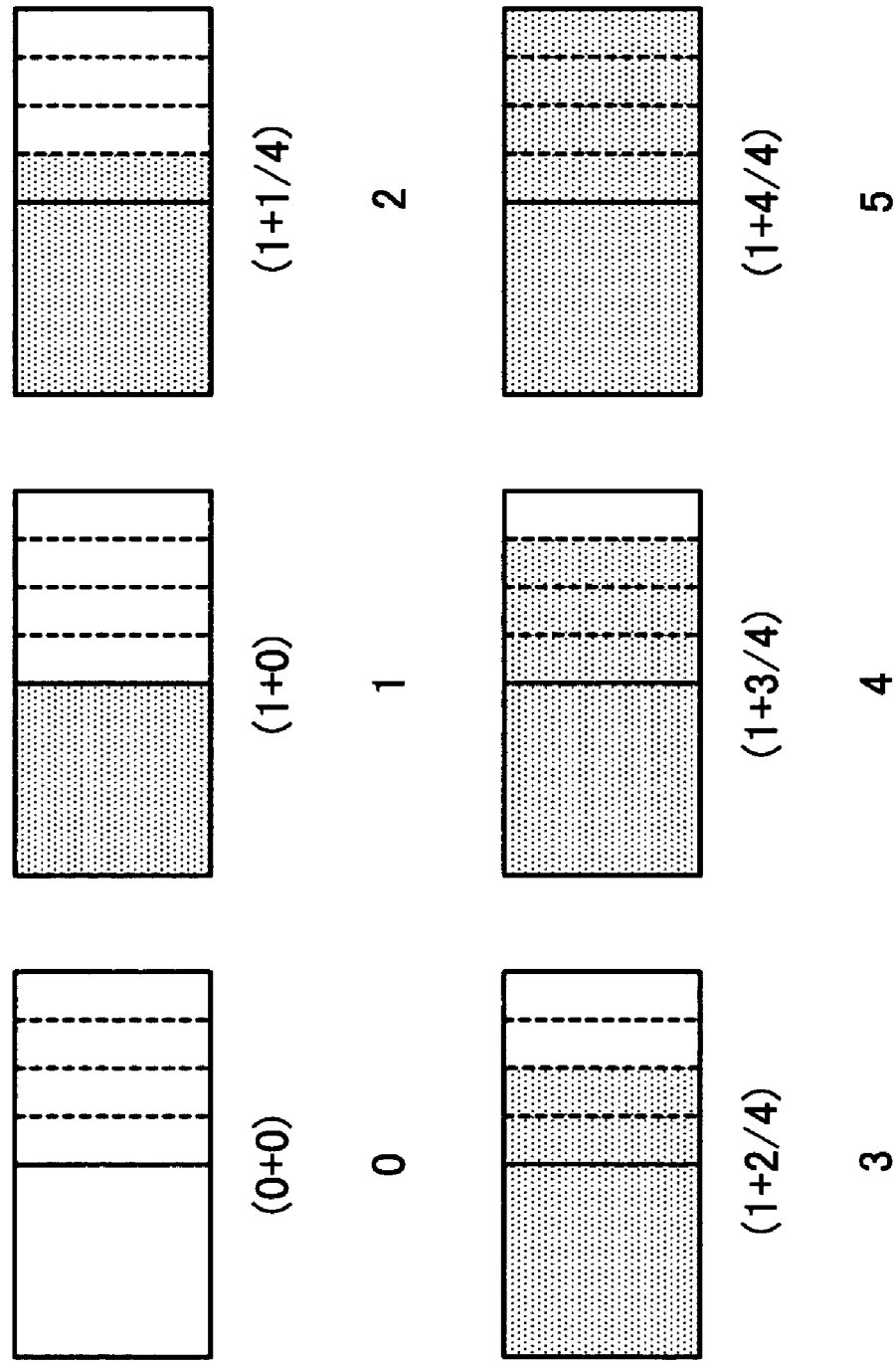
FIG. 3 shows a relationship between a quantization level and a pixel value.

Next, a description will be made of a relationship between a quantization level and a pixel value retained in the post-processing unit 18. FIG. 3 schematically shows a pixel value corresponding to a quantization level.

In the example shown in FIG. 3, one aggregated pixel is formed of two pixels. For each pixel, density of five shades of gray can be expressed. For convenience of description, each pixel is divided into four sections in the drawing. Since each pixel is respectively divided into four sections, when two pixels that form one aggregated pixel are combined together, one aggregated pixel can be divided into eight sections. As described above, when one aggregated pixel is formed of two pixels (n=2) and a density reproduction tone of each pixel has five levels (k=5), nine shades of gray can be reproduced at maximum for each aggregated pixel. That is, a maximum tone number of one aggregated pixel becomes 2×(5−1)+1=9 shades of gray. However, for the first pixel among the two pixels that form one aggregated pixel, even when the pixel value is controlled for reproducing the halftone, a dot formation at an electrophotographic printing is difficult to be influenced. This is due to a fact that since energy that exposes a photoreceptor is insufficient in the electrophotographic printing, the dot formation cannot be carried out stably. Therefore, for density levels of halftones (1/4, 2/4 and 3/4) in the first pixel, a quantization level "1", which is a common quantization level as a density level of tone subsequent to the halftone 3/4, is output as the quantization result. That is, in the first pixel, the density levels of 1/4, 2/4 and 3/4 do not exist. Meanwhile, for density levels of halftones in the second pixel, the quantization level is allocated for each 1/4 of the pixel density. By executing such a level number reduction processing by the quantization unit 16, a number of the quantization levels output from the quantization unit 16 becomes six (quantization levels 0 to 5) as shown in FIG. 3 and not the maximum tone number (nine).

That is, at the quantization level 0, a pixel value is not allocated to both of the pixels. At the quantization level 1, a pixel value "1" is allocated to one of the pixels and a pixel value is not allocated to the other pixel. That is, a pixel value (1+0) is allocated. At the quantization level 2, a pixel value "1" is allocated to one of the pixels and a pixel value "1/4" is allocated to the other pixel. That is, a pixel value (1+1/4) is allocated. At the quantization level 3, a pixel value "1" is allocated to one of the pixels and a pixel value "2/4" is allocated to the other pixel. That is, a pixel value (1+2/4) is allocated. At the quantization level 4, a pixel value "1" is allocated to one of the pixels and a pixel value "3/4" is allocated to the other pixel. That is, a pixel value (1+3/4) is allocated. At the quantization level 5, a pixel value "1" is allocated to both of the pixels. That is, a pixel value (1+4/4) is allocated.

Further, the pixel value allocated to the section of the second pixel corresponds to a fluctuation of an exposed amount of one pixel at printing, for example, corresponds to a parameter for adjusting an exposure time and an exposure strength.

By carrying out the quantization processing at six quantization levels, four halftones (the quantization levels 1 to 4) can be expressed between a state of zero (the quantization level 0) and a state of one (the quantization level 5). In this case, for example, when a pixel value is expressed by data of eight bits, a relationship between the quantization processing result (the quantization level) of the quantization unit 16 and the output pixel value output from the post-processing unit 18 is as shown in FIG. 4.

Figure 5:
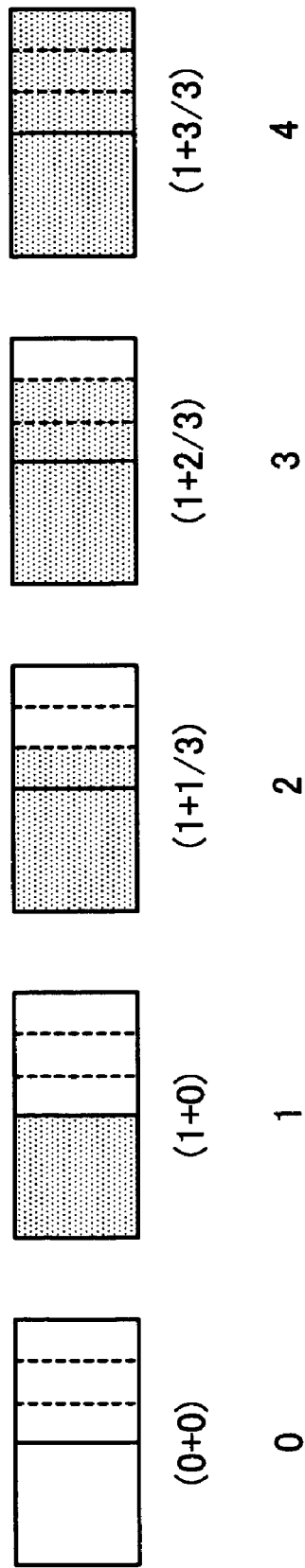
FIG. 5 shows another example of a relationship between a quantization level and a pixel value.

In the example shown in FIG. 5, one aggregated pixel is formed of two pixels. For each pixel, density of four shades of gray can be expressed. For convenience of description, each pixel is divided into three sections in the drawing. Since each pixel is respectively divided into three sections, when two pixels that form one aggregated pixel are combined together, one aggregated pixel can be divided into six sections. As described above, when one aggregated pixel is formed of two pixels (n=2) and a density reproduction tone of each pixel has four levels (k=4), seven shades of gray can be reproduced at maximum for each aggregated pixel. That is, a maximum tone number of one aggregated pixel becomes 2×(4−1)+1=7 shades of gray. However, for the first pixel among the two pixels that form one aggregated pixel, even when a pixel value is controlled for reproducing the halftone, a dot formation at an electrophotographic printing is difficult to be influenced. This is due to a fact that since energy that exposes a photoreceptor is insufficient in the electrophotographic printing, the dot formation cannot be carried out stably. Therefore, for density levels of halftones (1/3 and 2/3) in the first pixel, a quantization level "1", which is a common quantization level as a density level of tone subsequent to the halftone 2/3, is output as the quantization result. That is, in the first pixel, the density levels of 1/3 and 2/3 do not exist. Meanwhile, for density levels of halftones in the second pixel, the quantization level is allocated for each 1/3 of the pixel density. By executing such a level number reduction processing by the quantization unit 16, a number of the quantization levels output from the quantization unit 16 becomes five (quantization levels 0 to 4) as shown in FIG. 5 and not the maximum tone number (seven).

At the quantization level 0, a pixel value is not allocated to both of the pixels. At the quantization level 1, a pixel value "1" is allocated to one of the pixels and a pixel value is not allocated to the other pixel. That is, a pixel value (1+0) is allocated. At the quantization level 2, a pixel value "1" is allocated to one of the pixels and a pixel value "1/3" is allocated to the other pixel. That is, a pixel value (1+1/3) is allocated. At the quantization level 3, a pixel value "1" is allocated to one of the pixels and a pixel value "2/3" is allocated to the other pixel. That is, a pixel value (1+2/3) is allocated. At the quantization level 4, a pixel value "1" is allocated to both of the pixels. That is, a pixel value (1+3/3) is allocated.

By carrying out the quantization processing at five quantization levels, three halftones (the quantization levels 1 to 3) can be expressed between a state of zero (the quantization level 0) and a state of one (the quantization level 4). In this case, for example, when a pixel value is expressed by data of four bits, a relationship of the quantization processing result (the quantization level) of the quantization unit 16 and the output pixel value output from the post-processing unit 18 is as shown in FIG. 6.

Figure 7:
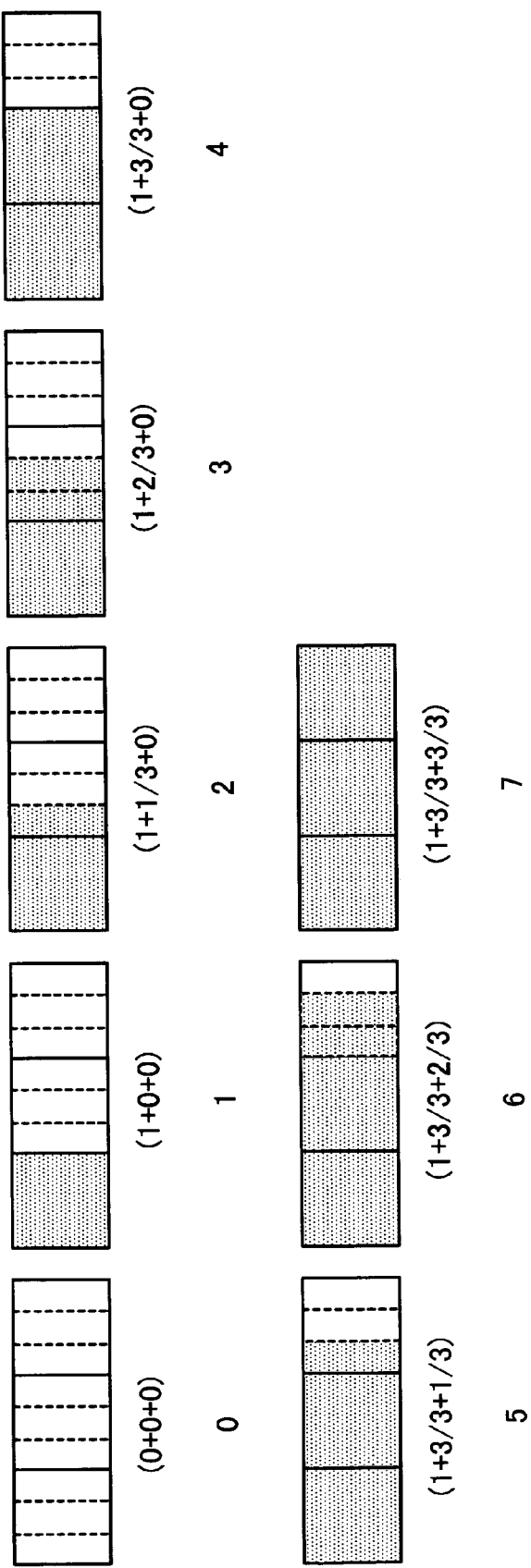
FIG. 7 shows another example of a relationship between a quantization level and a pixel value.

In the example shown in FIG. 7, one aggregated pixel is formed of three pixels. For each pixel, density of four shades of gray can be expressed. For convenience of description, each pixel is divided into three sections in the drawing. Since each pixel is respectively divided into three sections, when three pixels that form one aggregated pixel are combined together, one aggregated pixel can be divided into nine sections. As described above, when one aggregated pixel is formed of three pixels (n=3) and a density reproduction tone of each pixel has four levels (k=4), ten shades of gray can be reproduced at maximum for each aggregated pixel. That is, a maximum tone number of one aggregated pixel becomes 3×(4−1)+1=10 shades of gray. However, for the first pixel among the three pixels that form one aggregated pixel, even when the pixel value is controlled for reproducing the halftone, a dot formation at an electrophotographic printing is difficult to be influenced. This is due to a fact that since energy that exposes a photoreceptor is insufficient in the electrophotographic printing, the dot formation cannot be carried out stably. Therefore, for density levels of halftones (1/3 and 2/3) in the first pixel, a quantization level "1", which is a common quantization level as a density level of tone subsequent to the halftone 2/3, is output as the quantization result. That is, in the first pixel, the density levels of 1/3 and 2/3 do not exist. Meanwhile, for density levels of halftones in a second pixel and a third pixel, the quantization level is allocated for each 1/3 of the pixel density, respectively. By executing such a level number reduction processing by the quantization unit 16, a number of the quantization levels output from the quantization unit 16 becomes eight (quantization levels 0 to 7) as shown in FIG. 7 and not the maximum tone number (ten).

At the quantization level 0, a pixel value is not allocated to all of the pixels. At the quantization level 1, a pixel value "1" is allocated to a first pixel and a pixel value is not allocated to the other pixels. That is, a pixel value (1+0+0) is allocated. At the quantization level 2, a pixel value "1" is allocated to the first pixel, a pixel value "1/3" is allocated to the second pixel and a pixel value is not allocated to the third pixel. That is, a pixel value (1+1/3+0) is allocated. At the quantization level 3, a pixel value "1" is allocated to the first pixel, a pixel value "2/3" is allocated to the second pixel and a pixel value is not allocated to the third pixel. That is, a pixel value (1+2/3+0) is allocated. At the quantization level 4, a pixel value "1" is allocated to the first pixel and the second pixel and a pixel value is not allocated to the third pixel. That is, a pixel value (1+3/3+0) is allocated. At the quantization level 5, a pixel value "1" is allocated to the first pixel and the second pixel and a pixel value "1/3" is allocated to the third pixel. That is, a pixel value (1+3/3+1/3) is allocated. At the quantization level 6, a pixel value "1" is allocated to the first pixel and the second pixel and a pixel value "2/3" is allocated to the third pixel. That is, a pixel value (1+3/3+2/3) is allocated. At the quantization level 7, a pixel value "1" is allocated to all of the pixels. That is, a pixel value (1+3/3+3/3) is allocated.

By carrying out the quantization processing at eight quantization levels, six halftones (the quantization levels 1 to 6) can be expressed between a state of zero (the quantization level 0) and a state of one (the quantization level 7).

In the above-described first embodiment, the "prescribed order" in the level number reduction processing is "k−1". However, the "prescribed order" is determined according to the reproducibility of the image of the image output device and is not limited to the above-described example.

Second Embodiment

An image processing device of a second embodiment is the same as the first embodiment in that the image processing device of the second embodiment has the configuration shown in FIG. 1. However, the image processing device of the second embodiment differs from the first embodiment regarding the processing at the quantization unit 16 and the post-processing unit 18. In the following, a description will be made of the processing of the quantization unit 16 and the post-processing unit 18 in the image processing device of the second embodiment.

By executing a level number reduction processing, when a processing tone number per one pixel in an image output device is k, for quantization levels of [n×(k−1)+1] ways, the post-processing unit 18 allocates a pixel number by a number of combinations smaller than [n×(k−1)+1]. Further, in the second embodiment, the level number reduction processing is executed by the post-processing unit 18 instead of executing by the quantization unit 16 as in the first embodiment. n and k in the equation are as described in the first embodiment.

In the level number reduction processing of the second embodiment, for density levels from a next level of a minimum density level to a density level of a prescribed order, a common pixel value can be output to a quantization level output from the quantization unit 16.

The quantization unit 16 executes a quantization processing to divide levels from the minimum density level to a maximum density level evenly, that is, at an equal interval, and outputs quantization levels in a maximum tone number of ways as the quantization result. In this case, a quantization level "0" is the minimum density level and the quantization levels can be indicated by "1", "2", . . . and "n×(k−1) " in order. Suppose that the minimum density level, which can be reproduced stably in an image output device for reproducing an image, is a density level of a prescribed order. Then, in the level number reduction processing of the post-processing unit 18, for density levels from a second density level "1" to the density level of the prescribed order, a common pixel value, which is not a pixel value corresponding to the quantization level 0 of the minimum density level, is allocated. That is, for a density level which cannot be reproduced stably by the image output device, a common output pixel as the minimum density level among the density levels, which can be reproduced stably, is allocated. For example, in the electrophotographic printer, there are cases in which the reproduction stability at the low density level is low. Therefore, by applying the second embodiment, an image forming can be carried out at the density level having high reproduction stability.

As described above, by executing the level number reduction processing according to a feature of the image output device, the reproducibility in the halftone of the reproduced image can be improved.

Specifically, when dividing an aggregated pixel into n pixels (n≧2) by the post-processing unit 18, a number m of the quantization level output from the quantization unit 16 can be calculated by the following equation:

$$m = n \times (k-1) + 1$$

In this case, the post-processing unit 18 outputs a common pixel value for the quantization levels of 1 to (k−1).

Suppose that the "prescribed order" in the level number reduction processing is "k−1". Then, for the quantization levels 1 to "k−2", the pixel value that is the same as the quantization level "k−1", which is the next quantization level of the quantization level "k−2", is output. Accordingly, for one aggregated pixel, m=2+(k−1)×(n−1) ways of combinations of the pixel values are output.

Next, a description will be made of a relationship between a quantization level and a pixel value retained in the post-processing unit 18. In the example shown in FIG. 8, one aggregated pixel is formed of two pixels. For each pixel, density of five shades of gray can be expressed. For convenience of description, each pixel is divided into four sections in the drawing. Since each pixel is respectively divided into four sections, when two pixels that form one aggregated pixel are combined together, one aggregated pixel can be divided into eight sections. As described above, when one aggregated pixel is formed of two pixels (n=2) and a density reproduction tone of each pixel has five levels (k=5), nine shades of gray can be reproduced at maximum for each aggregated pixel. That is, a maximum tone number of one aggregated pixel becomes 2×(5−1)+1=9 shades of gray. However, for the first pixel among the two pixels that form one aggregated pixel, even when the pixel value is controlled for reproducing the halftone, a dot formation at the electrophotographic printing is difficult to be influenced. This is due to a fact that since energy that exposes a photoreceptor is insufficient in the electrophotographic printing, the dot formation cannot be carried out stably. In the present embodiment, although a number of the quantization levels is equal to the maximum tone number, a number of combinations of the pixel values corresponding to the quantization levels is reduced. That is, for the quantization levels "1" to "3" corresponding to the halftones in the first pixel (1/4, 2/4 and 3/4), a pixel value (1+0) is output. Further, the pixel value (1+0) is a common output pixel value as a quantization level "4", which is a quantization level subsequent to the halftone "3/4". That is, in the first pixel, the density levels of 1/4, 2/4 and 3/4 do not exist. Meanwhile, for the density levels of the halftones in the second pixel, the quantization level is allocated for each 1/4 of the pixel density and a corresponding output pixel value is output, respectively. By executing such a level number reduction processing by the post-processing unit 18, a number of combinations of the output pixel values output from the post-processing unit 18 becomes six (quantization levels 0, 1-4, 5, 6, 7 and 8) as shown in FIG. 8 and not the maximum tone number (nine).

Figure 8:
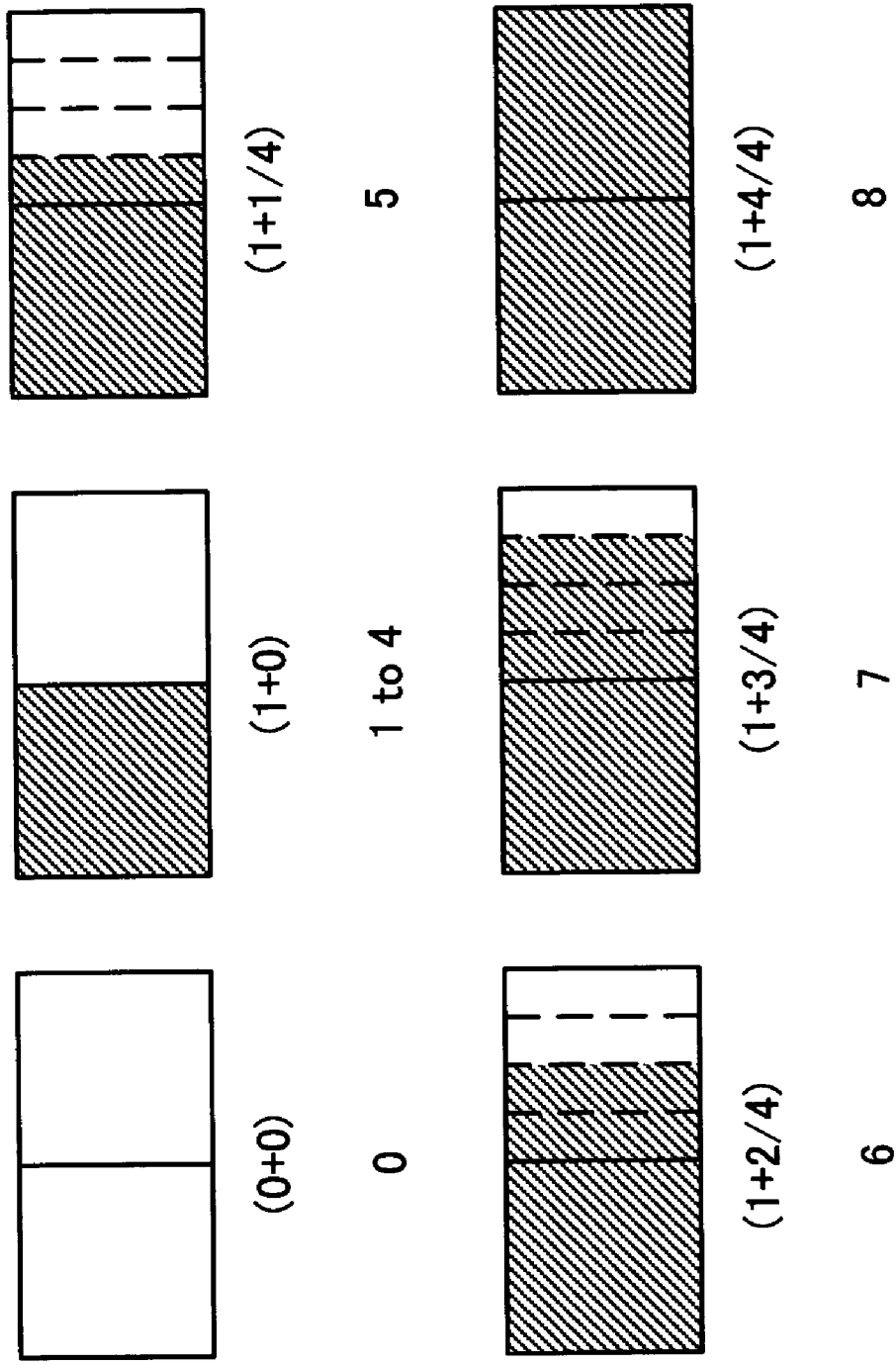
FIG. 8 shows another example of a relationship between a quantization level and a pixel value.

As shown in FIG. 8, at the quantization level 0, a pixel value is not allocated to both of the pixels. That is, a pixel value (0+0) is output from the post-processing unit 18. At the quantization levels 1 to 4, a pixel value "1" is allocated to one of the pixels and a pixel value is not allocated to the other pixel. That is, at the quantization levels 1 to 4, a common pixel value (1+0) is output from the post-processing unit 18. At the quantization level 5, a pixel value "1" is allocated to one of the pixels and a pixel value "1/4" is allocated to the other pixel. That is, at the quantization level 5, a pixel value (1+1/4) is output from the post-processing unit 18. At the quantization level 6, a pixel value "1" is allocated to one of the pixels and a pixel value "2/4" is allocated to the other pixel. That is, at the quantization level 6, a pixel value (1+2/4) is output from the post-processing unit 18. At the quantization level 7, a pixel value "1" is allocated to one of the pixels and a pixel value "3/4" is allocated to the other pixel. That is, at the quantization level 7, a pixel value (1+3/4) is output from the post-processing unit 18. At the quantization level 8, a pixel value "1" is allocated to both of the pixels. That is, at the quantization level 8, a pixel value (1+4/4) is output from the post-processing unit 18.

In this case, for example, when a pixel value is expressed by data of eight bits, a relationship between the quantization processing result (the quantization level) of the quantization unit 16 and the output pixel value output from the post-processing unit 18 is as shown in FIG. 9.

In the above-described second embodiment, the "prescribed order" in the level number reduction processing is "k−1". However, the "prescribed order" is determined according to the reproducibility of the image of the image output device and is not limited to the above-described example.

According to the first and the second embodiments of the present invention, since the quantization processing is carried out for each aggregated pixel, a load relating to the quantization processing can be reduced. Moreover, the quantization processing by the quantization unit 16 or the processing by the post-processing unit 18, in other words, the allocation of the pixel value, is carried out according to the feature of the image output device for reproducing an image. As a result, the reproducibility in the halftone of the reproduced image can be improved.

Third Embodiment

Figure 10:
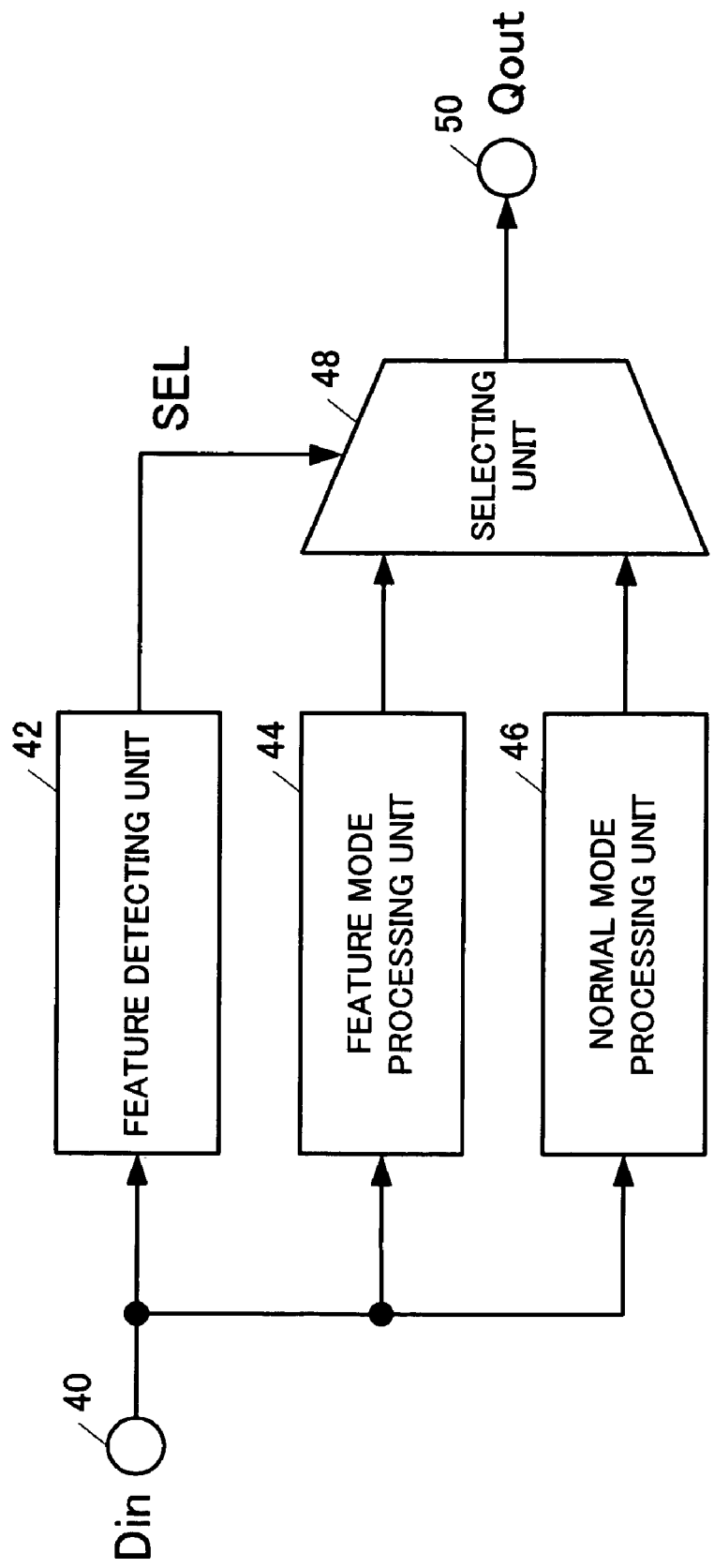
FIG. 10 is a block diagram showing an image processing device according to a third embodiment of the present invention.

FIG. 10 is a block diagram showing an image processing device according to a third embodiment of the present invention. The image processing device of the third embodiment includes a feature mode processing unit 44 as a first image processing unit, a normal mode processing unit 46 as a second image processing unit, a feature detecting unit 42 and a selecting unit 48. The feature mode processing unit 44 and the normal mode processing unit 46 have different quantization processing methods. The feature detecting unit 42 detects whether an area where the input image data belongs is an area that emphasizes reproduction of a line image or an area that emphasizes reproduction of tone in accordance with input image data. The selecting unit 48 selects either one of an output pixel value of the feature mode processing unit 44 and an output pixel value of a normal mode processing unit 46 in accordance with a detection result of the feature detecting unit 42.

The feature mode processing unit 44 has the configuration as shown in FIG. 1. That is, the feature mode processing unit 44 includes a pre-processing unit 12, an adder 14, a quantization unit 16, a post-processing unit 18 and a surrounding error calculating unit 22. The pre-processing unit 12 calculates an average pixel value of an aggregated pixel formed of a plurality of adjacent pixels for the input image data. The adder 14 calculates a correction average pixel value by adding a correction error value to an average pixel value of a target aggregated pixel to be a processing object. The quantization unit 16 carries out a quantization processing of the correction average pixel value at a quantization level of a prescribed number. The post-processing unit 18 divides the aggregated pixel into a plurality of pixels and allocates a pixel value corresponding to the quantization level to each of the divided pixels. The surrounding error calculating unit 22 calculates a correction error value for processing a surrounding target aggregated pixel in accordance with a quantization error generated in the quantization processing.

By the above-described configuration, the feature mode processing unit 44 carries out a tone number reduction processing on an input image by an error diffusion method for each aggregated pixel. Accordingly, a load relating to the quantization processing can be reduced and reproducibility in halftone of a reproduced image can be improved.

The normal mode processing unit 46 can be a conventional image processing unit, which is used in a quantization processing for reducing a tone number, for example, an error diffusion method, an ordered dither method or a simple binarization method. That is, the normal mode processing unit 46 carries out a general tone number reduction processing on the input image for each pixel.

Figure 11:
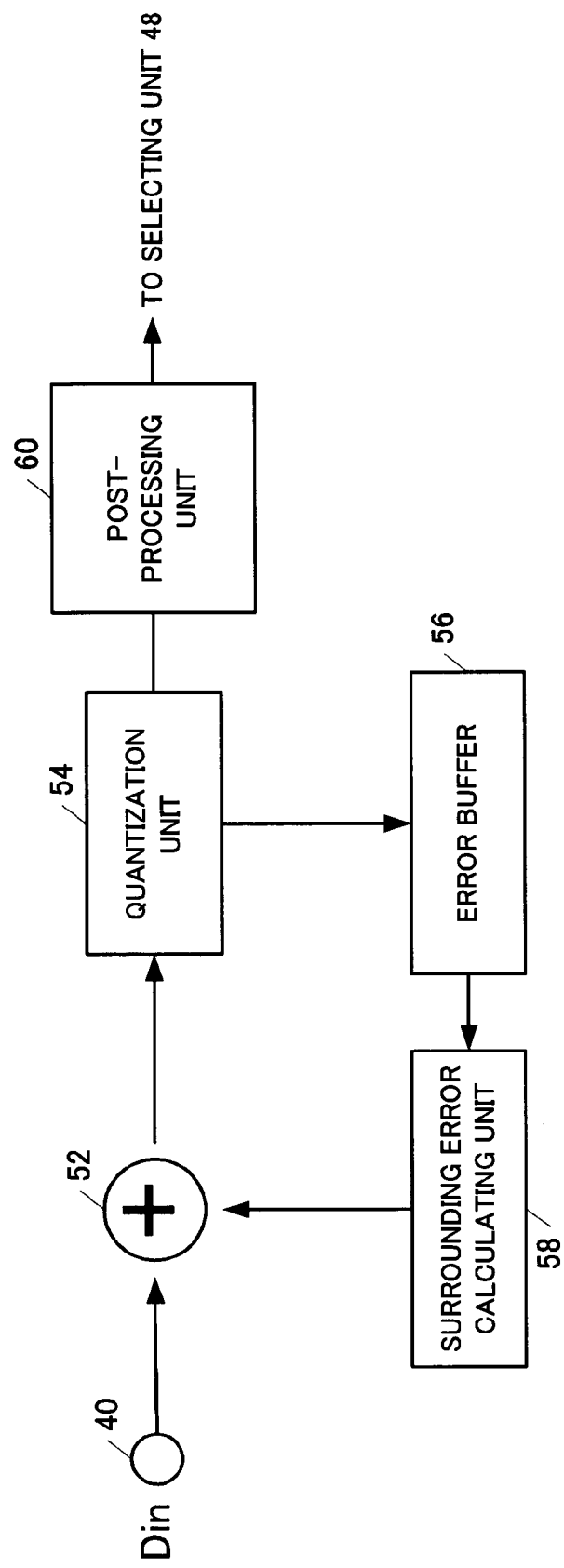
FIG. 11 shows an example of a normal mode processing unit of the image processing device according to the third embodiment of the present invention.

FIG. 11 is a block diagram showing an example of a configuration of the normal mode processing unit 46. As shown in FIG. 11; the normal mode processing unit 46 is an image processing unit for processing the input image data by the error diffusion method. The normal mode processing unit 46 includes an adder 52, a quantization unit 54, a post-processing unit 60 and a surrounding error calculating unit 58. The adder 52 calculates a correction pixel value by adding a correction error value to a pixel value of a target pixel to be the processing object for the input image data. The quantization unit 54 carries out a quantization processing of the correction pixel value at a quantization level of a prescribed number. The post-processing unit 60 outputs a pixel value corresponding to the quantization level. The surrounding error calculating unit 58 calculates a correction error value for processing a pixel located around the target pixel in accordance with a quantization error generated in the quantization processing.

By the above-described configuration, the normal mode processing unit 46 processes the input image data for each pixel, unlike the feature mode processing unit 44 which processes the input image data for each aggregated pixel formed of a plurality of pixels. That is, for input image data Din input from an input terminal 40, while sequentially moving a target pixel to be a processing object, the adder 52 calculates a correction pixel value by adding a correction error value. The quantization unit 54 outputs a quantization level corresponding to the correction pixel value output from the adder 52 as a quantization result. A quantization error generated in the quantization processing is output to an error buffer 56. The post-processing unit 60 retains a correspondence relationship between the quantization level and the pixel value. For the target pixel, the post-processing unit 60 refers to the correspondence relationship and outputs a pixel value corresponding to the quantization level output from the quantization unit 54. The surrounding error calculating unit 58 calculates a correction pixel value by the error diffusion method by using the quantization error stored in the error buffer 56 and outputs the calculated correction pixel value to the adder 52. The surrounding error calculating unit 58 can add weight as described above to the error of the surrounding pixel of the target pixel.

The feature detecting unit 42 detects whether an area where the input image data Din belongs is located in an area that emphasizes reproduction of tone (picture or halftone dot) or an area that emphasizes reproduction of a line image (character) in accordance with the input image data Din. Specifically, the feature detecting unit 42 carries out the detection by binarizing each pixel of a prescribed range and comparing a continuing length of white or black with a prescribed threshold value. For example, when the continuing length is long, the feature detecting unit 42 detects that the area where the input image data Din belongs is an area of a photograph. When the continuing length is short, the feature detecting unit 42 detects that the area where the input image data Din belongs is an area of halftone dot. When the continuing length is a medium length, the feature detecting unit 42 detects that the area where the input image data Din belongs is an area of a line image. The feature detecting unit 42 can also carry out the detection by detecting an edge, counting an edge amount of a prescribed range and comparing the counted edge amount with the prescribed threshold value. In this case, when an edge amount is small, the feature detecting unit 42 detects that the area where the input image data Din belongs is an area of a photograph. When an edge amount is large, the feature detecting unit 42 detects that the area where the input image data Din belongs is an area of halftone dot. When an edge amount is an intermediate amount, the feature detecting unit 42 detects that the area where the input image data Din belongs is an area of a line image. The edge amount is a differentiation of a difference between the target pixel and a pixel adjacent to the target pixel and is an amount which can be obtained by a spatial filter. If there is no difference with respect to the adjacent pixel, the edge amount is zero. If the difference with respect to the adjacent pixel is large, the edge amount increases.

Since the area that emphasizes the reproduction of the tone is a photograph area and a halftone dot area, the feature mode processing having high halftone reproducibility is executed. Meanwhile, since the area that emphasizes the reproduction of the line image is a line image area such as a character and a line and high halftone reproducibility is not requested, the normal mode processing is executed.

When the area processed under the feature mode and the area processed under the normal mode are switched, the feature detecting unit 42 transmits a select signal SEL indicating such a change to the selecting unit 48. As the select signal SEL, for example, while the line image area is detected, a signal of "L" level can be output. Further, the signal of the "L" level indicates that the input image data is not from the feature part. When the photograph area or the halftone dot area is detected, a signal of "H" level can be output. Further, the signal of the "H" level indicates that the input image data is from the feature part.

An output pixel value from the feature mode processing unit 44 and an output pixel value from the normal mode processing unit 46 are input to the selecting unit 48. When the detection result from the feature detecting unit 42 is a signal indicating that a pixel to be detected is a feature part (the "H" level), the selecting unit 48 selects the output pixel value from the feature mode processing unit 42. When the detection result from the feature detecting unit 42 is a signal indicating that a pixel to be detected is not a feature part (the "L" level), the selecting unit 48 selects the output pixel value from the normal mode processing unit 46. As described above, the selecting unit 48 can select the output pixel value according to whether the area where the input image data belongs is the area that emphasizes the reproduction of the tone and the area that emphasizes the reproduction of the line image.

Output image data Qout formed of the output pixel value selected by the selecting unit 48 is output from an output terminal 50.

Figure 12:
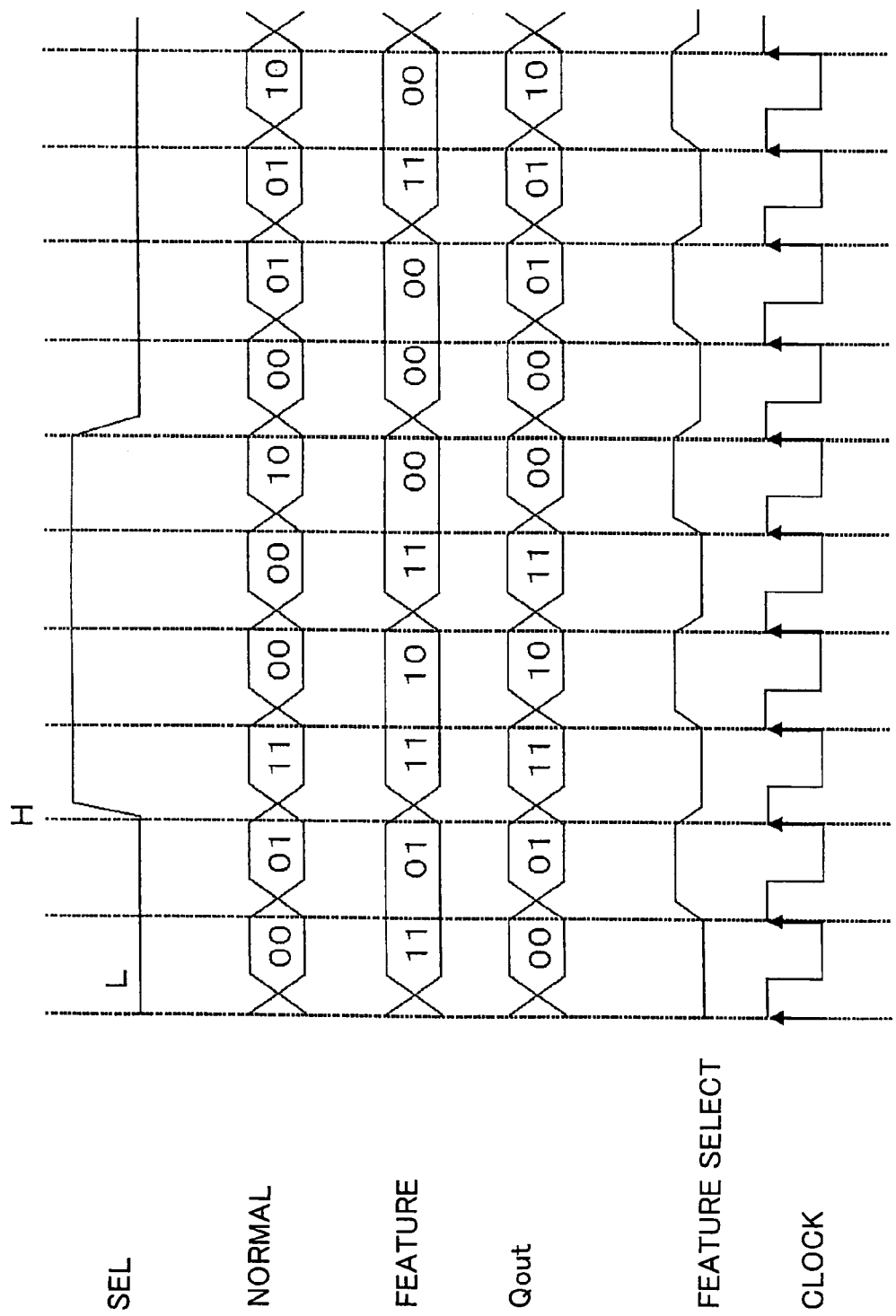
FIG. 12 shows a selection processing of an output pixel value.

FIG. 12 shows an input and output timing and an input and output content of the select signal SEL, the output pixel value by the normal mode processing, the output pixel value by the feature mode processing, a feature select signal SELECT indicating an output timing of the pixel value processed in the feature mode processing, a clock signal CLOCK for switching the feature select signal SELECT and the output image data Qout.

In FIG. 12, each box of the output pixel value by the normal mode processing and the feature mode processing corresponds to the pixel number for each processing. FIG. 12 shows an example in which the pixel value of one pixel is expressed by two bits. For example, the pixel value by the normal mode processing (a normal pixel value) is input and output for each pixel, and the pixel value by the feature mode processing (a feature pixel value) is input and output for each two pixels.

Furthermore, the clock signal CLOCK, which synchronizes with the input of the normal pixel value, is input. The feature select signal SELECT, which switches levels so as to synchronize with the input of the feature pixel value and to synchronize with the input of the clock signal CLOCK, is input.

When the select signal SEL is the "L" level, the normal pixel value is selected as the output image data Qout. Meanwhile, when the select signal SEL switches to the "H" level and the feature select signal is "L", high two bits of the feature pixel value are output as the output image data Qout. When the feature select signal is "H", low two bits of the feature pixel value are output as the output image data Qout. As described above, when the select signal SEL is the "H" level, in accordance with the level of the feature select signal, either one of the high two bits and the low two bits of the feature pixel value is selected as the output image data Qout.

In FIG. 12, the timing in which the select signal SEL switches from the "L" level to the "H" level is not timing in-between an aggregated pixel in the feature pixel value (timing between the pixel of the high two bits and the pixel of the low two bits), but is timing between the aggregated pixels. That is, between a first aggregated pixel and a second aggregated pixel, the select signal SEL switches from the "L" level to the "H" level. The timing in which the select signal SEL switches from the "H" level to the "L" level is also not timing in-between an aggregated pixel in the feature pixel value, but is timing between the aggregated pixels. That is, between a third aggregated pixel and a fourth aggregated pixel, the select signal SEL switches from the "H" level to the "L" level.

The feature select signal SELECT switches between L and H in response to the switching of the clock signal CLOCK. That is, the feature select signal SELECT switches from "L" to "H" under timing in-between an aggregated pixel of the feature pixel value (between pixels) and switches from "H" to "L" under timing between the aggregated pixels of the feature pixel value. Therefore, in the example shown in FIG. 12, when the select signal SEL switches from the "L" level to the "H" level, the feature select signal SELECT switches from "H" to "L". When the select signal SEL switches from the "H" level to the "L" level, the feature select signal SELECT switches from "H" to "L".

As described above, in the example shown in FIG. 12, for the first pixel and the second pixel, since the select signal SEL is the "L" level, the output pixel value Qout is "00" and "01", which are the normal pixel values. For a third pixel to a sixth pixel, the select signal SEL is the "H" level and the feature select signal SELECT switches from "L" to "H" to "L" to "H". Therefore, the output pixel value Qout is "11" and "10", which are the "high two bits" and the "low two bits" of the feature pixel values immediately after the select signal SEL switches to the "H" level, and "11" and "00", which are the "high two bits" and the "low two bits" of the subsequent feature pixel values. For a seventh pixel to a tenth pixel, since the select signal SEL is the "L" level again, the output pixel value Qout is "00", "01", "01" and "10", which are the normal pixel values.

In FIG. 12, the select signal SEL switches under the timing between the aggregated pixels of the feature pixel value. However, when the select signal SEL switches under the timing in-between an aggregated pixel of the feature pixel value, the following selection processing is carried out.

In FIG. 12, under the timing between the third pixel and the fourth pixel, that is, under the timing in-between the second aggregated pixel, suppose that the select signal SEL switches from the "L" level to the "H" level. Then, the same selection processing as the example shown in FIG. 12 is carried out for the first pixel and the second pixel. For the third pixel, the select signal SEL is also the "L" level. Therefore, in the same manner as the example shown in FIG. 12, the output pixel value Qout is the normal pixel value "11". However, for the fourth pixel, since the select signal SEL is the "H" level, the output pixel value Qout is the feature pixel value unlike the example shown in FIG. 12. In this case, since the feature select signal SELECT is "H", the output pixel value Qout is "10", which is the pixel value of the low two bits of the second aggregated pixel, and not "11", which is the pixel value of the high two bits.

In FIG. 12, suppose that the select signal SEL switches from the "H" level to the "L" level under the timing between the fifth pixel and the sixth pixel, that is, under the timing in-between the third aggregated pixel of the feature pixel value. Then, for the fifth pixel, the select signal SEL is the "H" level and the feature select signal SELECT is "L". Therefore, in the same manner as the example shown in FIG. 12, the output pixel value Qout is "11", which is the pixel value of the high two bits of the third aggregated pixel. However, for the sixth pixel, since the select signal SEL is the "L" level, unlike the example shown in FIG. 12, the output pixel value Qout is "10", which is the normal pixel value.

In the above-described example, as an example to emphasize the reproduction of the tone, the pixel of the photograph area or the halftone dot area is processed by the feature mode and the pixel of the line image area is processed by the normal mode. However, as an example to emphasize the reproduction of the line image, the pixel of the line image area can be processed by the feature mode and the pixel of the photograph area or the halftone dot area can be processed by the normal mode.

According to the third embodiment, the feature detecting unit 42 is provided to detect the feature part and in accordance with the detection result, the processing method can be changed for the area that emphasizes the reproduction of the tone and the area that emphasizes the reproduction of the line image. Accordingly, the image processing can be carried out according to the feature part of the image and the reproducibility in the halftone of the reproduced image can be improved.

All of the first, the second and the third embodiments of the present invention are preferable to be applied to a printer of an electrophotographic method (a Light Emitting Diode (LED) method or a laser method). Further, in the above-described examples, a plurality of pixels adjacent to one another in a main scanning direction are aggregated and the tone number reduction processing is executed for each aggregated pixel. However, the present invention also has the same effect when a plurality of pixels adjacent to one another in a sub scanning direction are aggregated and the tone number reduction processing is executed for each aggregated pixel. Moreover, a plurality of pixels adjacent to one another in both the main scanning direction and the sub scanning direction can be aggregated and the same processing can be carried out.

The invention claimed is:

1. An image processing device comprising:
   a pre-processing unit that calculates an average pixel value of an aggregated pixel formed of a plurality of adjacent pixels for input image data;
   an adding unit that calculates a correction average pixel value by adding a correction error value to an average pixel value of a target aggregated pixel to be a processing object;
   a quantization unit that carries out a quantization processing of the correction average pixel value at a quantization level of a prescribed number;
   a post-processing unit that divides the aggregated pixel into a plurality of pixels and allocates a pixel value corresponding to the quantization level to each of the divided pixels; and
   a surrounding error calculating unit that calculates a correction error value for processing a surrounding aggregated pixel in accordance with a quantization error generated in the quantization processing, wherein
   by executing a level number reduction processing, when a processing tone number per one pixel in an image output device is k, the quantization unit executes the quantization processing at a quantization level of a number smaller than [n×(k−1)+1],
   when the level number reduction processing divides levels from a minimum density level to a maximum density level evenly into a plurality of levels, levels from a next level of the minimum density level to a density level of a prescribed order are output as a common quantization level, and
   when dividing the aggregated pixel into n pixels (n≧2) by the post-processing unit, a number m of the quantization level output from the quantization unit is expressed by the following equation: $m=2+(k-1)\times(n-1)$.

2. The image processing device according to claim 1, wherein for a quantization error of a surrounding aggregated pixel of the target aggregated pixel, the surrounding error calculating unit calculates a correction error value by adding weight corresponding to a relative positional relationship between the surrounding aggregated pixel and the target aggregated pixel.

3. The image processing device according to claim 1, wherein the post-processing unit retains a correspondence relationship between the quantization level and an output pixel value, and by referring to the correspondence relationship, the post-processing unit allocates the output pixel value corresponding to the quantization level to each of the divided pixels.

4. The image processing device according to claim 3, wherein the post-processing unit retains a correspondence relationship between the quantization level and the output pixel value for each output bit number, and by referring to the correspondence relationship, the post-processing unit allocates the output pixel value corresponding to the quantization level to each of the divided pixels by an output bit number that complies with an image output device.

5. An image processing device comprising:
a pre-processing unit that calculates an average pixel value of an aggregated pixel formed of a plurality of adjacent pixels for input image data;
an adding unit that calculates a correction average pixel value by adding a correction error value to an average pixel value of a target aggregated pixel to be a processing object;
a quantization unit that carries out a quantization processing of the correction average pixel value at a quantization level of a prescribed number;
a post-processing unit that divides the aggregated pixel into a plurality of pixels and allocates a pixel value corresponding to the quantization level to each of the divided pixels; and
a surrounding error calculating unit that calculates a correction error value for processing a surrounding aggregated pixel in accordance with a quantization error generated in the quantization processing, wherein
by executing a level number reduction processing, when a processing tone number per one pixel in an image output device is k, for quantization levels of $[n\times(k-1)+1]$ ways, the post-processing unit allocates pixel values by a number of combinations smaller than $[n\times(k-1)+1]$,
for density levels from a next level of a minimum density level to a density level of a prescribed order, the level number reduction processing outputs a common pixel value for the quantization level output from the quantization unit, and
when dividing the aggregated pixel into n pixels ($n\geq 2$) by the post-processing unit, a number m of the quantization level output from the quantization unit is expressed by an equation $m=n\times(k-1)+1$ and the post-processing unit outputs a common pixel value for quantization levels of orders from 1 to $(k-1)$.

6. An image processing method comprising:
a pre-processing step of calculating an average pixel value of an aggregated pixel formed of a plurality of adjacent pixels for input image data;
an adding step of calculating a correction average pixel value by adding a correction error value to an average pixel value of a target aggregated pixel to be a processing object;
a quantizing step of carrying out a quantization processing of the correction average pixel value at a quantization level of a prescribed number;
a post-processing step of dividing the aggregated pixel into a plurality of pixels and allocating a pixel value corresponding to the quantization level to each of the divided pixels;
a surrounding error calculating step of calculating a correction error value for processing a surrounding target aggregated pixel in accordance with a quantization error generated in the quantization processing; and
an outputting step of outputting the divided pixels, wherein
at the quantizing step, by executing a level number reduction processing, when a processing tone number per one pixel in an image output device is k, the quantization processing is executed at a quantization level of a number smaller than $[n\times(k-1)+1]$,
when the level number reduction processing divides levels from a minimum density level to a maximum density level evenly into a plurality of levels, levels from a next level of the minimum density level to a density level of a prescribed order are output as a common quantization level, and
when dividing the aggregated pixel into n pixels ($n\geq 2$) at the post-processing step, a number m of the quantization level output at the quantizing step is expressed by the following equation: $m=2+(k-1)\times(n-1)$.

7. An image processing method comprising:
a pre-processing step of calculating an average pixel value of an aggregated pixel formed of a plurality of adjacent pixels for input image data;
an adding step of calculating a correction average pixel value by adding a correction error value to an average pixel value of a target aggregated pixel to be a processing object;
a quantizing step of carrying out a quantization processing of the correction average pixel value at a quantization level of a prescribed number;
a post-processing step of dividing the aggregated pixel into a plurality of pixels and allocating a pixel value corresponding to the quantization level to each of the divided pixels;
a surrounding error calculating step of calculating a correction error value for processing a surrounding target aggregated pixel in accordance with a quantization error generated in the quantization processing; and
an outputting step of outputting the divided pixels, wherein
at the post-processing step, by executing a level number reduction processing, when a processing tone number per one pixel in an image output device is k, for quantization levels of $[n\times(k-1)+1]$ ways, a pixel value is allocated by a number of combinations smaller than $[n\times(k-1)+1]$,
for levels from a next level of a minimum density level to a density level of a prescribed order, the level number reduction processing outputs a common pixel value for the quantization level output at the quantizing step, and
when dividing the aggregated pixel into n pixels ($n\geq 2$) at the post-processing step, a number m of the quantization level output at the quantizing step is calculated by the following equation:

$$m=n\times(k-1)+1;\text{ and}$$

at the post-processing step, a common pixel value is output for quantization levels of orders from 1 to $(k-1)$.

8. The image processing method according to claim 7, wherein at the surrounding error calculating step, the correction error value is calculated by applying weight, which corresponds to a relative positional relationship between a surrounding aggregated pixel and the target aggregated pixel, to the quantization error of the surrounding aggregated pixel.

9. The image processing method according to claim 7, wherein at the post-processing step, a correspondence relationship between the quantization level and an output pixel value is retained and by referring to the correspondence relationship, the output pixel value corresponding to the quantization level is allocated to each of the divided pixels.

10. The image processing method according to claim 9, wherein at the post-processing step, the correspondence relationship between the quantization level and the output pixel value is retained for each output bit number and by referring to the correspondence relationship, the output pixel value corresponding to the quantization level is allocated to each of the divided pixels by an output bit number that complies with an image output device.

* * * * *